June 13, 1939.　　　　E. SCHÜTZ　　　　2,162,493

CONVERSION SYSTEM

Filed Nov. 27, 1937

WITNESSES:
E. A. McCloskey
S. A. Stricklett

INVENTOR
Eberhard Schütz.
BY
O. B. Buchanan
ATTORNEY

Patented June 13, 1939

2,162,493

UNITED STATES PATENT OFFICE 2,162,493

CONVERSION SYSTEM

Eberhard Schütz, Berlin-Steglitz, Germany, assignor to Westinghouse Electric & Manufacturing Company, East Pittsburgh, Pa., a corporation of Pennsylvania Application November 27, 1937, Serial No. 176,830
In Germany December 21, 1936

4 Claims. (Cl. 175—364)

My invention relates to a conversion system, and particularly to a converter utilizing mechanical contact devices associated with a single electric valve or unidirectional conductor for converting alternating current to direct current or vice versa.

It has heretofore been proposed to construct conversion systems utilizing an electric valve for each phase of the alternating current being converted and to place mechanical contactors in series with the electric valves in order to eliminate the probability of arc-back during the period of inverse potential on the electric valves.

It has also been heretofore proposed to construct conversion systems utilizing only as many valve paths as there are simultaneously active phases in the converter and to utilize a suitable switching mechanism for connecting the valves to the successive phase terminals. The systems are not only unsatisfactory because of the incidental sparking by the various contact terminals but are quite expensive because of the fact that a relatively large number of valve elements must be utilized.

In the apparatus according to my invention, a single valve path is utilized to interrupt the current through an opening contactor while the initial current is carried directly through a contact device without the interposition of an electric valve. By utilizing a single valve operable only to interrupt the reverse current through the opening contact not only are the multiple valve paths eliminated but the size and character of the valve path itself is materially reduced, since the valve must only handle the commutation or phase to phase voltage and not the terminal voltage of the system.

My invention, by carrying most of the operating current directly instead of through a valve element, not only decreases the expense for the valve element but increases the efficiency by eliminating the losses in the valve paths.

It is, accordingly, an object of my invention to provide a conversion system utilizing mechanical contacts to connect the various phases in sequence to the direct current circuit and a single valve path for successively interrupting each of the phases.

It is a further object of my invention to provide a conversion system in which the working current is carried substantially independent of the valve mechanism.

Figure 1:
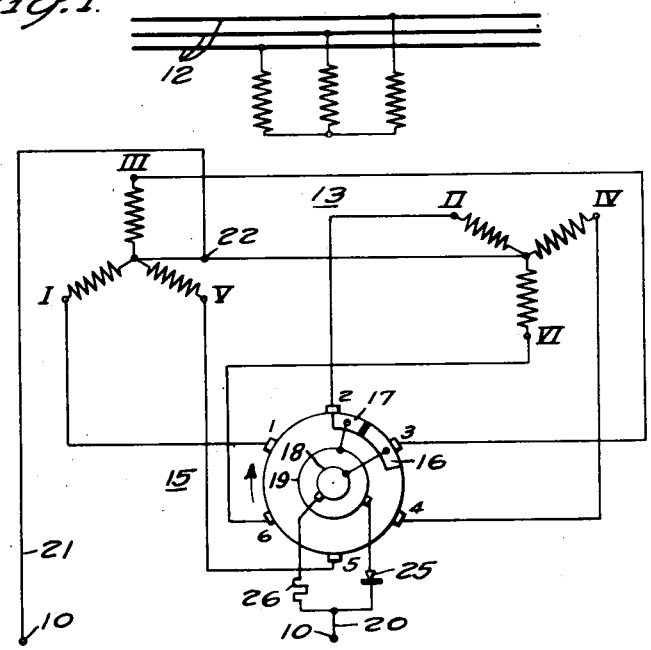
Figure 2:
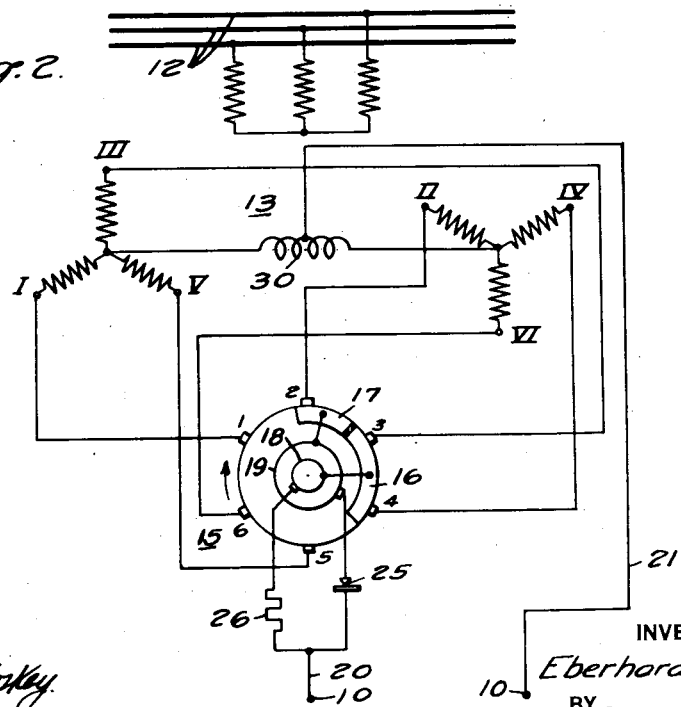

Other objects and advantages of my invention will be apparent from the following detailed description taken in conjunction with the accompanying drawing, in which:

Figure 1 is a schematic illustration of a six-phase rectifier embodying my invention; and Fig. 2 is a similar illustration of the double three-phase rectifier according to my invention.

In the illustrative embodiment of my invention according to Fig. 1, a direct-current circuit 10 is supplied with energy from an alternating-current circuit 12 by means of a suitable interconnecting transformer herein illustrated as a six-phase diametrical transformer 13, the current flow from the transformer 13 to the direct-current line 10 being controlled by a mechanical contact device 15 having a plurality of fixed contact elements 1 to 6 connected to the phase terminals I to VI of the interconnecting transformer 13 and a mechanical contact device herein illustrated as a rotating commutator-like device 15 having two insulated segments 16 and 17, the two segments 16 and 17 covering an area greater than the distance between two successive fixed contacts, but any individual section 16 or 17 being less than the distance between successive fixed contacts. Each of the contact elements 16 and 17 is preferably connected by means of a suitable slip ring arrangement 18—19 to a terminal extending outside of the contact device 15 and connected in parallel to one side 20 of the direct-current circuit 10 while the other side 21 of the direct-current circuit 10 is connected to the neutral or star point 22 of the transformer device 13.

Connected in series between the movable contact elements 16—17 is a suitable unidirectional conductor 25, preferably of the dry-plate type variety, although any suitable valve may obviously be used. In the operation of the device the commutator 15 is rotated at synchronous speed by any suitable mechanism such as a synchronous motor, not shown, so that the leading contact 16 successively contacts the various fixed contact elements 1 to 6; that is, the elements connected to the terminals of the transformer phases I to VI while the other or following contact element 17 engages with the phase terminal to be disconnected, the valve element 25 being in series not only between the contact elements 16—17 but between the trailing contact element 17 and the direct current circuit.

As the commutator device turns the leading contact element 16 establishes contact at any predetermined point on the incoming half cycle and maintains contact directly between the phase terminal and one side 20 of the direct current circuit 10. On the receding half of the alternating current wave, the commutator device 15 moves forward so that the leading contact 16 is disengaged from the original phase terminal and makes contact with the next succeeding phase terminal while the following contact 17 makes contact with the outgoing phase terminal and because of the interposition of the electric valve 25, current will flow through this terminal only during the interval that the phase voltage is greater than the direct current line voltage. As soon as the phase terminal voltage of the outgoing phase falls below the direct current voltage, the valve 25 will interrupt current flow through the trailing or breaking contact element, so that the mechanical break at the contact 17 will be accomplished substantially without any sparking.

For high voltage devices it may sometimes be found that the resistance of the valve element 25 may cause undesirable current conditions in the transformer windings. However, this may be offset by supplying a suitable resistor 26 having a value substantially equal to the forward resistance of the valve element 25 in series with the unvalved portion of the converter 15.

In the modification according to Fig. 2, the diametrical transformer has been replaced with a double three-phase transformer, that is, the star groups of the transformer have been separated by a suitable interphase transformer 30. Since the interphase transformer 30 averages the terminal voltage of 2-phases in opposite groups so that they carry current simultaneously, it is necessary to increase the length of the leading contact 16 so that it makes simultaneous connection with the two averaged phases of the converter while the following or breaking contact 17 will remain substantially the same size so that it will only connect with that phase which is being disconnected.

In the operation of this form of my invention, the leading contact constantly connects with two of the fixed contact elements 1 to 6 so that phase windings in each of the star groups are directly connected to one side 20 of the direct current circuit 10 while the phase to be disconnected is constantly connected in the same side 20 of the direct current circuit 10 by means of the electric valve 25 whereby the average currents flow directly through the commutator device 15 to the direct current circuit and only the current flowing in the phase to be disconnected may at any time flow in the valve element 25.

While for purpose of illustration, I have shown and described specific embodiments of my invention, it will be apparent to those skilled in the art that changes and modifications can be made therein without departing from the true spirit of my invention or the scope of the appended claims.

I claim as my invention:

1. An electric current translating system for connection between an alternating current circuit and a direct current circuit comprising a winding having a plurality of phase terminals and a mid terminal, contact elements connected to said phase terminals, said mid terminals being connected to one side of said direct current circuit, a contact device for successively making and breaking contact between the other side of said direct current circuit and said phase terminals, a plurality of contact elements on said contact device, the total length of said contact elements on said contact device being sufficient to make contact with all of the simultaneously active phase terminals, one of the contact elements of said contact device being a make contact and another being a break contact, the make contact being directly connected to the direct current circuit through a resistor element and a unidirectional conductor connected between the break contact and the direct current circuit.

2. A rectifier system comprising a polyphase supply circuit, a direct current load circuit, a polyphase star connected winding means energized from said alternating current circuit, one side of the direct current circuit being connected to the star point of said winding means, a commutating device for periodically connecting the individual phases of said winding means to the direct current circuit in cyclic sequence, overlapping in time, a single unidirectional conductor associated with said commutating device, characterized by the fact that at any instant the unidirectional conductor is connected in series with the phase to be disconnected while the remaining active phases are directly connected to the direct current circuit through a resistor element having a resistance substantially equal to the forward resistance of the undirectional conductor.

3. A converting system for transferring current between an alternating current circuit and a direct current circuit comprising transformer means having a star connected winding, one side of said direct current connected to the star point of said winding, a rotating contact device, two contact elements on said contact device, a contact element connected to each terminal of said transformer means, said terminal contact elements being spaced around the periphery of said rotating contact device, the contact elements of said rotating device having a combined length greater than the distance between adjacent terminal contact elements, the leading contact element being directly connected to said direct current circuit and a unidirectional conductor interposed between the following contact element and the direct current circuit.

4. A rectifier system comprising an n-phase alternating current supply circuit, a direct-current consumption circuit, transformer means including a double n-phase winding coupled through an interphase winding, terminal contacts connected to the phase terminals of said double n-phase winding, two contact elements for successively making contact with said terminal contacts, said two contact elements being of different size whereby the leading contact element makes connection with a plurality of said terminal contacts and the trailing contact element makes connection with only one of said terminal contacts, a unidirectional conductor connected between said two contact elements in such manner as to prevent current flow from said leading contact to said trailing contact.

EBERHARD SCHÜTZ.